United States Patent [19]
Kase et al.

[11] Patent Number: 5,790,501
[45] Date of Patent: Aug. 4, 1998

[54] INFORMATION REPRODUCING DEVICE

[75] Inventors: Toshiyuki Kase; Hiroshi Nishikawa, both of Tokyo, Japan

[73] Assignee: Asahi Kogaku Kogyo Kabushiki Kaisha, Tokyo, Japan

[21] Appl. No.: 939,097

[22] Filed: Sep. 26, 1997

Related U.S. Application Data

[63] Continuation of Ser. No. 683,984, Jul. 22, 1996, abandoned.

[30] Foreign Application Priority Data

Jul. 25, 1995 [JP] Japan ................... 7-189464

[51] Int. Cl.⁶ ....................................... G11B 7/135
[52] U.S. Cl. ............................. 369/110; 369/112
[58] Field of Search .................. 369/110, 112, 369/109, 111, 119, 100, 44.11, 44.14, 44.17, 44.21, 44.22

[56] References Cited

U.S. PATENT DOCUMENTS

| | | |
|---|---|---|
| 5,223,970 | 6/1993 | Oono et al. |
| 5,297,114 | 3/1994 | Itoh et al. |
| 5,309,423 | 5/1994 | Noguchi et al. |
| 5,341,246 | 10/1994 | Oono et al. |
| 5,383,173 | 1/1995 | Kim et al. ............ 369/110 X |
| 5,471,456 | 11/1995 | Tokumaru et al. |

FOREIGN PATENT DOCUMENTS 6230222  8/1994  Japan.

*Primary Examiner*—Muhammad N. Edun
*Attorney, Agent, or Firm*—Greenblum & Bernstein P.L.C.

[57] ABSTRACT

A laser beam emitted from a laser diode passes through a polarizing separating plane of a first polarization beam splitter and forms a beam spot on a magneto-optic disk. The plane of polarization of the laser beam that is reflected at a magnetic film provided on the magneto-optic disk is rotated by the Kerr effect in a fixed direction depending on the direction of magnetization of the magnetic film. The reflected laser beam is made incident on the polarizing separating plane of the first polarization beam splitter. The angle of the polarizing separating plane of the first polarization beam splitter is adjusted with respect to an optic path of the laser beam so that the P polarization component of the laser beam is reflected by 20%.

15 Claims, 3 Drawing Sheets

1

INFORMATION REPRODUCING DEVICE

This application is a continuation of application Ser. No. 08/683,984, filed Jul. 22, 1996, now abandoned.

BACKGROUND OF THE INVENTION

1. Field of the Invention

The present invention relates to an information reproducing device of a magneto-optic disk device for reproducing information recorded on a magneto-optic disk.

2. Description of the Related Art

A magneto-optic disk device records digitized information as a direction of magnetization of each magnetic domain of a magnetic film formed on the surface of the disk by irradiating it with a high energy laser beam and applying an external magnetic field which direction is suitably inverted according to the digitized information on each magnetic domain. The magneto-optic disk device also reproduces information recorded on a magneto-optic disk. To effect the reproduction, the magneto-optic disk device irradiates the disk with a laser beam consisting of linearly polarized light having a plane of polarization oriented in a predetermined direction to the magnetic domains of the magnetic film formed on the magneto-optic disk. The direction of the plane of polarization of the laser beam that is reflected by the respective magnetic domains is rotated in either the + direction or − direction, depending on the direction of magnetization of the respective domains, by Kerr effect. The magneto-optic disk device can therefore reproduce the information recorded on the magneto-optic disk as an electrical signal by detecting the changes in the direction of the plane of polarization of the reflected beam.

In an information reproducing device that reproduces the magnetized information, the laser beam emitted from the semiconductor laser is directed to the magneto-optic disk from the vertical direction. A polarizing beam splitter which transmits an incident laser beam emitted from the semiconductor laser and separates a reflected laser beam that is reflected by the magneto-optic disk from the optic path of the incident laser beam is installed. The polarizing separating plane of this polarization beam splitter has a characteristic that it reflects practically 100% of an S polarization component of incident light and a predetermined proportion of a P polarization component thereof. The aim to restrict the reflectance for the P polarization component is to apparently increase the rotational angle of the direction of polarization of the incident light by the Kerr effect with reproduction of the P polarization component, and to reduce the loss of the laser light emitted from the semiconductor laser and directed to the magneto-optic disk D.

Error in the reflectance of the polarizing separating plane for the P polarized light influences a result of processing by a signal processing system, increases the signal-to-noise ratio in the signal processing system and causes variation of amplitude of output signal between respective products. The conditions of the reflection characteristic must therefore be accurately satisfied. Conventionally, the polarization beam splitter is precisely processed in order to satisfy these conditions.

However, satisfying the condition of the reflection characteristic, (specifically, a characteristic of a polarizing separating film formed on the polarizing separating plane and an angle of the polarizing separating plane) while satisfying no-phase condition is extremely difficult even if a reflectivity error of about 1%, or an angular error of about 2 minutes, is allowable. A polarization beam splitter that does not satisfy the condition of the reflection characteristic can not be used, because it does not achieve the designed reflectance described above even though it is accurately positioned in an information reproducing device. Therefore, the manufacturing yield of polarization beam splitters is poor, which increases costs of the information reproducing device.

SUMMARY OF THE INVENTION

It is a primary object of the present invention, which was contrived in view of the above problem, to achieve a designed reflectance for P polarized light with a polarization beam splitter which has not been manufactured as designed, by utilizing dependency of reflectance on incident angel (that is, inclinational characteristic), which means that the reflectance for P polarized light at the polarizing separating plane varies depending on the incident angle.

According to the present invention, the information reproducing device comprises a device for emitting linearly polarized light, a device for detecting the change in a direction of polarization of the linearly polarized light reflected at the magnetic film of the magneto-optic disk, and a beam splitter provided with a polarizing separating plane that is mounted between the emitting device and the magneto-optic disk with the polarizing separating plane intersecting an optical path of the reflected polarized light at an angle which departs from the predetermined designed angle.

The emitting device may be constructed of a semiconductor laser or solid-state laser that can emit linearly polarized light, or a combination of a gas laser and a polarizing plate that converts the laser light emitted from the gas laser into linearly polarized light.

BRIEF DESCRIPTION OF THE DRAWINGS

The invention will be described below in detail with reference to the accompanying drawings in which.

DESCRIPTION OF THE PREFERRED EMBODIMENTS

The present disclosure relates to subject matter contained in Japanese Patent Application No. 7-189464 (filed on Jul. 25th, 1995), which is expressly incorporated herein by reference in its entirety.

A preferred embodiment of the present invention will now be described referring to the accompanying drawings.

FIRST EMBODIMENT

Figure 1:
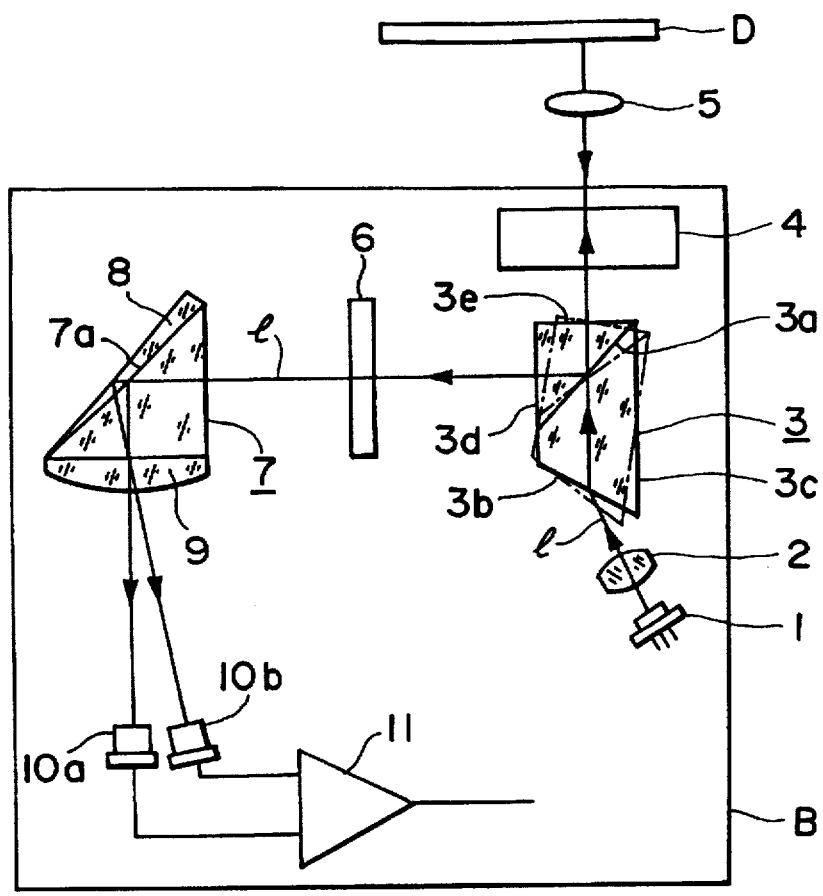
FIG. 1 is an optical layout diagram illustrating major parts of an information reproducing device according to a first embodiment of the present invention.

FIG. 1 is an optical layout diagram showing only the information reproducing device in the pick-up device of a magneto-optic disk device. Depiction of a writing device for recording information on a magneto-optic disk D is therefore omitted in FIG. 1. However, in the following description, it will be assumed that the digitized information has already been recorded on the magneto-optic disk D shown in FIG. 1 by means of the writing device, not shown, and that the magnetic domains are magnetized upwards or downwards in the thickness direction depending on the bits of the digitized information.

In FIG. 1, the laser beam emitted from a laser diode 1 passes through a collimator lens 2, a first polarization beam splitter 3, a mirror 4 and an objective lens 5 to converge on the magneto-optic disk D. The reflected laser beam from the magneto-optic disk D returns to the first polarization beam splitter 3 along the same optical path, passes through a half-wave plate 6, and is separated into two beams by a second polarization beam splitter 7. One of the separated beams directly passes through a condenser lens 9 onto a first photodiode 10a. The other separated beam, after entering an optical wedge 8, is again incident on the second polarization beam splitter 7. The other separated beam passes through the condenser lens 9 along an optical path different from that of the above-described beam, and is directed to a second photodiode 10b. All these optical elements, except for the mirror 4 and the objective lens 5, are fixed on a base plate B. It should be noted that the plane of incidence of the first polarization beam splitter 3 is parallel to the paper surface of FIG. 1. Consequently, through the whole description of the optical path of the laser beam within the reproducing device, a component in a direction parallel to the paper surface of FIG. 1 will be called a P polarization component, while a component in a direction normal to the paper surface of FIG. 1 will be called an S polarization component.

The various optical elements are described below.

The laser diode 1 to an irradiating device which emits a laser beam consisting only of linearly polarized light. The collimator lens 2 collimates the laser light.

Figure 2:
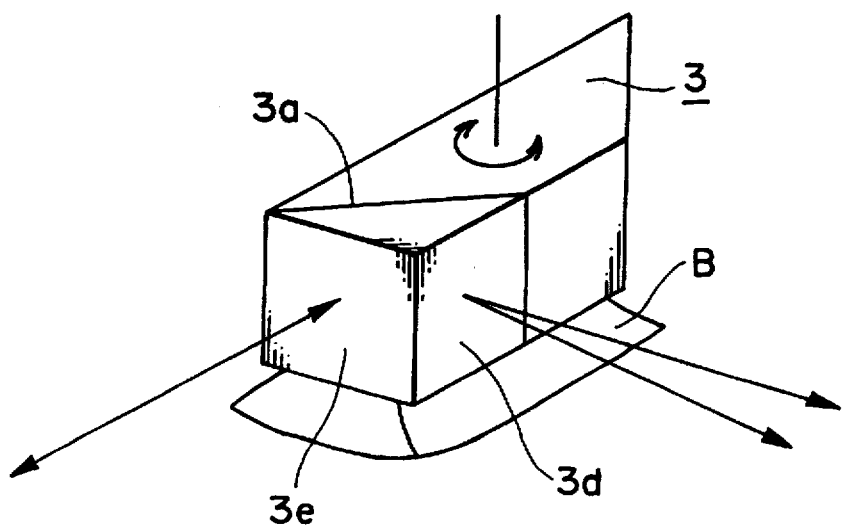
FIG. 2 is a perspective view of a first polarization beam splitter of FIG. 1.

The first polarization beam splitter 3 has a shape of a quadrangular prism with trapezoidal surface as a whole, as shown in FIG. 2. In more detail, its surface 3d adjacent to the half-wave plate 6, and the surface 3c on the opposite side thereof, are mutually parallel. These two surfaces 3c, 3d are arranged parallel to optical path 1 of the laser beam transmitted from the side of the collimator lens 2. Surface 3b, adjacent to the collimator lens 2, is the surface on which the laser beam is made incident. Surface 3b is inclined with respect to surfaces 3c, 3d in order to make the beam shape of the laser light circular. Surface 3e, adjacent to the mirror 4, is at a right angle with respect to surfaces 3c, 3b, so that it will be perpendicular to the optical path 1 of the laser beam incident on, and reflected by, the magneto-optic disk D.

Within this first polarization beam splitter 3 is a polarizing separating plane 3a inclined at 45 degrees with respect to surface 3d and 3e. The designed polarization characteristics of the polarizing separating plane 3a transmits 80% of a P polarization component and 1% of a S polarization component for light incident from the side of the surface 3b parallel to the surfaces 3c and 3d; and reflects 20% of the P polarization component and 99% of the S polarization component toward the surface 3d of light is made incident from the side of the surface 3e parallel to surfaces 3c and 3d, i.e. if light is made incident from the side of the surface 3e at an angle of incidence of 45 degrees to surface 3a. It is noted that the linearly polarized laser beam that is emitted from the laser diode 1 is a P polarized laser beam in relation to the polarizing separating plane 3a.

In order to realize such a polarization characteristic, a multilayer film consisting of films of various refractive indices is applied on the polarizing separating plane 3a. The conditions of the respective films of this multilayer optical thin film are set so that the reflectance for a P polarization component is 0% when the incident angle of the light with respect to the polarizing separating plane 3a is the Brewster's angle. If the incident angle of the light with respect to the polarizing separating plane 3a is progressively varied from the Brewster's angle, the reflectance of the plane 3a for the P polarization component gradually becomes larger. The structure of the multilayer coating is designed so that the above polarization characteristics is satisfied when this angle is exactly 45 degrees.

Figure 3:
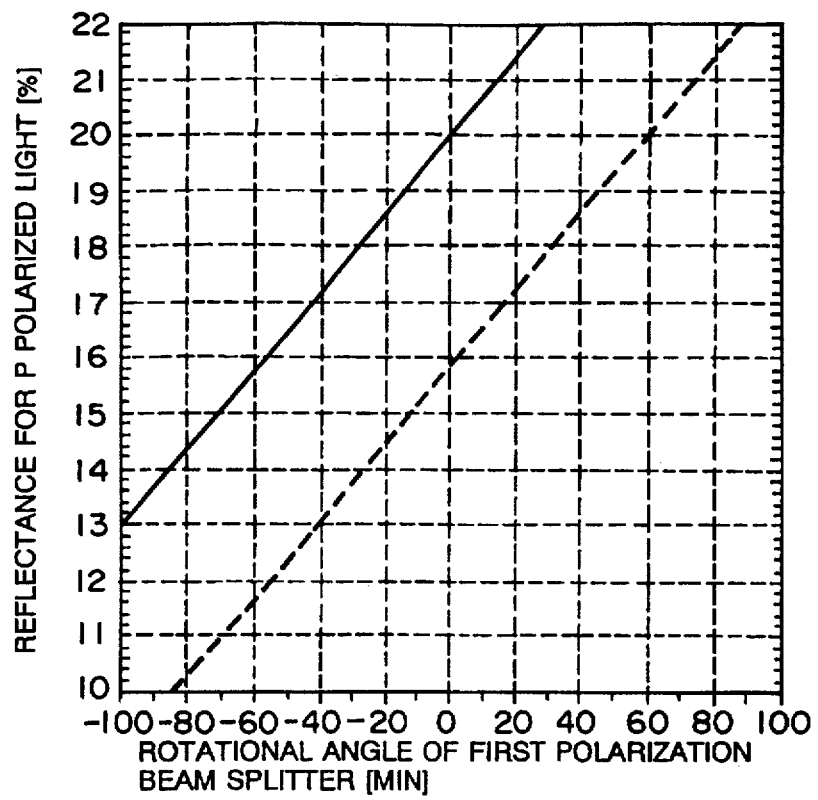
FIG. 3 is a characteristic graph of angle of inclination of the first polarization beam splitter of FIG. 1 with respect to P polarization component.

FIG. 3 shows the relationship (that is, inclinational characteristic for the P polarization component) between the reflectance of the polarizing separating plane 3a for the P polarization component and the inclinational angle of the first polarization beam splitter 3 by means of a continuous line which is referred as an inclinational characteristic line. In FIG. 3, the horizontal axis indicates the inclinational angle of the first polarization beam splitter 3 in the plane of the P polarization direction (that is, in the plane of incidence), taking an inclination at which the incident angle of light with respect to the polarizing separating plane 3a is 45 degrees as origin (0 minutes). The units along the horizontal axis are minutes, and the direction of inclination for which the incident angle of the light with respect to the polarizing separating plane 3a becomes smaller is taken as the + direction. On the other hand, the vertical axis in FIG. 3 indicates the reflectance of the polarizing separating plane 3a for P polarized light, of which units are percent.

As can be seen from FIG. 3, the inclinational characteristic for the P polarization component is a proportional characteristic and the amount of change of the reflectance is about 4% for every 60 minutes (1 degree) change of the inclinational angle. It should be noted that the amount of change of the incident angle of light at the polarizing separating plane 3a corresponds to ⅗ of the amount of change of the inclinational angle of the first polarizing beam splitter 3. Consequently, the amount of change of reflectance is about 7% for every 60 minutes (1 degree) of change of incident angle. It should be noted that, if the conditions (that is, film thickness condition or refractive index condition) of the multilayer coating depart from the designed values, its polarization characteristic is also varied, and the inclinational characteristic line is shifted as shown in FIG. 3 by means of the dotted line. The dotted line in FIG. 3 is the inclinational characteristic line in the case that the reflectance of the polarizing splitting plane 3a for P polarization component is 15.8%, with the incident angle 45 degrees.

Figure 4:
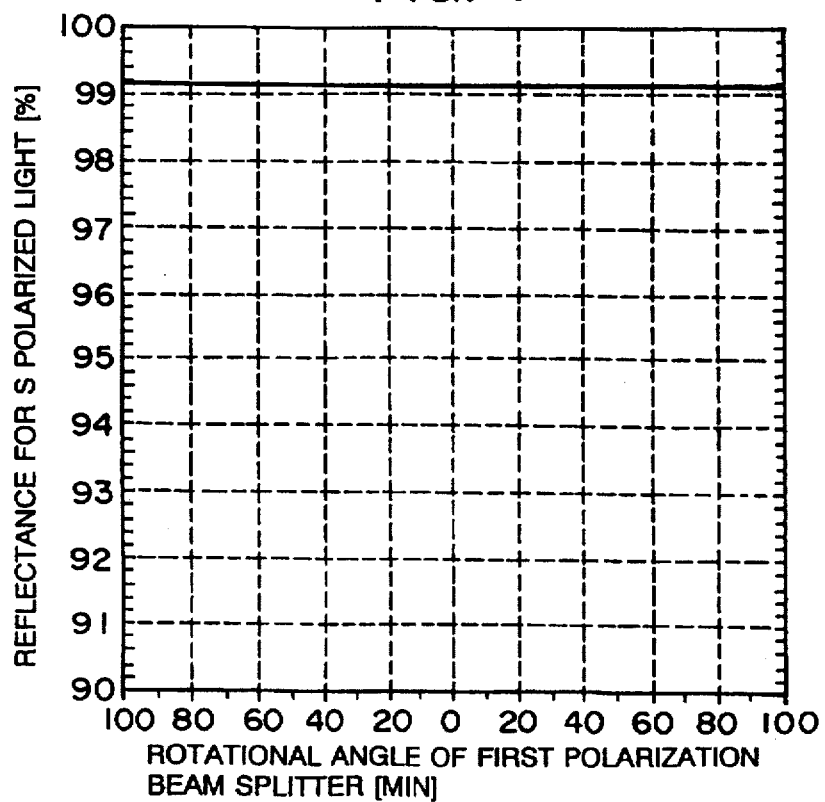
FIG. 4 is a characteristic graph of angle of inclination of the first polarization beam splitter of FIG. 1 with respect to S polarization component.

In contrast, FIG. 4 shows the relationship between the reflectance of the polarizing separating plane 3a for the S polarization component and the inclinational angle of the first polarization beam splitter 3. As can be seen from FIG. 4, the reflectance for the S polarization component does not depend on inclinational angle of the polarization beam splitter 3 i.e. incident angle of the light at the polarizing separating plane 3a.

Accordingly, if the angle between the polarizing separating plane 3a and the surfaces 3c, 3d is exactly 45 degrees, and the designed conditions of the multilayer coating (that is, film thickness condition and refractive index condition) are satisfied, the first polarization beam splitter 3 is fixed on the base plate B, with both surfaces 3c, 3d made parallel to the optical path 1 of the reflected light from the magneto-optic disk D, as shown by the continuous line in FIG. 1. In this way, the polarization characteristics described above are realized.

However, if the conditions of the angle between the polarizing separating plane 3a and the surfaces 3c, 3d or the conditions of the multilayer coating (that is, film thickness condition, refractive index condition) are not satisfied, the first polarization beam splitter 3 is rotated so that the polarizing separating plane 3a reflects 20% of P polarization component of the laser beam 1 and then fixed on the base plate B as shown by the single-dotted chain line in FIG. 1. For example, if only the condition of the angle between the polarizing separating plane 3a and the surfaces 3c, 3d is not satisfied, the polarization beam splitter 3a is rotated so that the incident angle of the laser beam 1 with respect to polarizing separating plane 3a becomes 45 degrees.

If the reflectance of the polarizing separating plane 3a for the P polarized light exceeds 20%, despite the incident angle of the laser beam 1 with respect to the polarizing separating plane 3a being 45 degrees, the polarization beam splitter 3 is rotated counterclockwise in FIG. 1 by 15 minutes for every 1% of excess of reflectance. The incident angle of the laser beam 1 with respect to the polarizing separating plane 3a becomes larger (in other words, so that it approaches to the Brewster's angle).

Likewise, if the reflectance of the polarizing separating plane 3a for the P polarized light is less than 20%, the polarization beam splitter 3 is rotated clockwise in FIG. 1 by 15 minutes for every 1% of shortage of reflectance. The incident angle of the laser beam 1 with respect to the polarizing separating plane 3a become narrower (in other words, so that it goes away from the Brewster's angle).

For example, if the inclinational characteristic of the polarizing separating plane 3a is as shown by the dotted line in FIG. 3, the polarization beam splitter 3 is rotated in the clockwise direction by approximately 60 minutes (1 degree) from the position shown in continuous lines in FIG. 1 (which is a position where the two surfaces 3c, 3d are parallel to the optic path 1). When thus rotated, the incident angle of laser beam 1 with respect to the polarizing separating plane 3a becomes 44 degrees and 24 minutes, and the reflectance of the polarizing separating plane 3a for the P polarized light becomes about 20%. The polarization characteristic given above is thus satisfied.

Mirror 4 reflects the laser beam emitted from the first polarization beam splitter 3 in a direction perpendicular to the paper surface of FIG. 1 and directs laser beam to the magneto-optic disk D from a perpendicular direction, (in FIG. 1, for convenience, the optical path of the incident laser beam and the optical path of the reflected beam are drawn in the same plane). The mirror 4 tracks the magneto-optic disk D by sliding in the radial direction of the disk.

The objective lens 5 focuses the laser beam reflected by the mirror 4 to form a beam spot on the magnetic film of the magneto-optic disk D. This objective lens 5 is focused by a servo motor, not shown. This objective lens 5 is also moved in the radial direction of the disk together with the mirror 4.

The direction of polarization of the laser beam reflected by the magnetic film of the magneto-optic disk D is rotated by Kerr effect by a predetermined angle from the P polarization direction, depending on the direction of magnetization of the magnetic domain where the beam spot is formed. Specifically, supposing a coordinate system of which horizontal axis is taken as the P polarization direction and of which vertical axis is taken as the S polarization direction, the direction of polarization of the laser beam is rotated from the horizontal axis by an angle +θ'k degrees if the direction of magnetization of the magnetic domain is upwards, while, the direction of polarization of the laser beam is rotated by an angle −θ'k degrees from the horizontal axis if the direction of magnetization of the magnetic domain is downwards. The laser beam that has been rotated by Kerr effect is reflected at polarizing separating plane 3a of the first polarization beam splitter 3. Then, as described above, the rotational angle of the direction of polarization of the laser beam with respect to the P polarization direction by Kerr effect is apparently increased.

The half-wave plate 6 is arranged in the optical path 1 in such a manner that the optic axis of the half-wave plate 6 makes an angle of 22.5 degrees with respect to the P polarization direction. This half-wave plate 6 is a plane-parallel crystal plate, of which thickness is determined so that the phase difference of the laser beam crossing the plane-parallel surfaces thereof at a right angle becomes 180 degrees. The half-wave plate 6 therefore rotates the direction of polarization of incident laser beam by twice the angle between the direction of polarization and its optic axis. As a result, when a laser beam which is linearly polarized in the P polarization direction is made incident to this half-wave plate 6, this half-wave plate 6 rotates the direction of polarization of the linearly polarized laser beam by 45 degrees with respect to the P polarization direction. The direction of polarization of the laser beam that has been rotated by the Kerr effect about the P polarization direction in response to the direction of magnetization of the respective magnetic domain of the magnetic film on the magneto-optic disk D becomes therefore rotated about a plane inclined by an angle of 45 degrees with respect to the P polarization direction after being passed through the half-wave plate 6.

Second polarization beam splitter 7 has the shape of a triangular prism with an isosceles triangular plane, with its surface facing the half-wave plate 6 perpendicular to the optical path 1. The inclined surface of this second polarization beam splitter 7 constitutes a polarizing separating plane 7a. This polarizing separating plane 7a transmits 100% of the P polarization component and reflects 100% of the S polarization component. It should be noted that the P polarization component and S polarization component referred to here indicate the components in each direction of the laser beam that has passed through the half-wave plate 6. An optical wedge 8, that becomes progressively thinner away from the half-wave plate 6, is cemented on the outside of this polarizing separating plane 7a. The outer surface of this optical wedge 8 is coated with a substance that reflects 100% of incident light. Consequently, the beam of the P polarization component that is incident on this optical wedge 8 passes through the second polarization beam splitter 7. The beam of the S polarization component and the beam of the P polarization component which are thus separated are emitted from the second polarization beam splitter 7 through the surface nearest the photodiodes 10 along respectively different optical paths.

The condenser lens 9 is cemented on the surface of the second polarization beam splitter 7 nearest the photodiodes 10. Consequently, the beams of the components in the respective directions that are incident to this condenser lens 9 along the respective optical paths are respectively focused by the condenser lens 9.

The first photodiode 10a detects the beam of the S polarization component and outputs an electrical signal corresponding to its variation of intensity. The electrical signal that is output from this first photodiode 10a is low level when the direction of magnetization of the magnetic domain at which the laser beam is reflected is upward, and is high level when the direction of magnetization of the magnetic domain is downward. Correspondingly, the second photodiode 10b detects the beam of the P polarization component and outputs an electrical signal corresponding to its variation of intensity. The electrical signal that is output from the second photodiode 10b is high level when the direction of magnetization of the magnetic domain where the laser light was reflected is upward, and is low level when the direction of magnetization of the magnetic domain is downward. Comparing the output of the first photodiode 10a with the output of the second photodiode 10b, their amplitude is the same and their variations are in inverse phase. Consequently, an electrical signal with large amplitude corresponding to the change in rotational angle by Kerr effect by taking the difference of these outputted signals can be obtained. Also, in-phase noise such as the dark current of photodiodes 10a, 10b can be cancelled. In order to take this difference, the outputted signals of the first photodiode 10a and the second photodiode 10b are inputted to a differential amplifier 11. This second polarization beam splitter 7, the optical wedge 8, the condenser lens 9, the photodiodes 10, and the differential amplifier 11 compose the detecting elements that detect the inclination of the plane of polarization of the laser beam reflected by the magnetized film of magneto-optic disk D as high or low output signal of the differential amplifier 11.

In the present embodiment, before fixing the first polarization beam splitter 3 to the base plate B, it is not necessary to measure accurately the angle between the polarizing separating plane 3a and the surfaces 3c, 3d or to measure the reflectance of the multilayer coating. Otherwise, the output of the differential amplifier 11 is observed while the first polarization beam splitter 3 is gradually tilted with respect to the optical path 1, with the laser beam emitted from the laser diode 1. The inclination of the first polarization beam splitter 3 is stopped when the output of the differential amplifier 11 becomes a maximum. The first polarization beam splitter 3 is then fixed on the base plate B.

With the present embodiment, it is not necessary to precisely form the angle between the polarizing separating plane 3a and the surfaces 3c and 3d or to make the reflectance of the multilayer coating for the P polarized light incident parallel to surfaces 3c, 3d precisely 20% at the time of manufacturing the first polarization beam splitter 3. However, it is desirable that the refractive index condition of the various films of the multilayer coating should be satisfied so that a Brewster's angle exists with respect to the polarizing separating plane 3a.

The first polarization beam splitter 3 having some degree of dispersion of characteristic as referred above is suitably inclined with respect to the optic path 1 from the state in which designed values were satisfied, in the plane of incidence of the laser beam with respect to the polarizing separating plane 3a. As a result, the designed reflection characteristic in regard to the P polarized light can be realized. This therefore enables the acceptance line in production of the first polarization beam splitter to be lowered, raising the yield. For example, so long as the reflectance for P polarized light incident at 45 degrees with respect to its polarizing separating plane 3a is within the range from 14 to 25%, the polarization beam splitter may be acceptable. As a result, manufacturing costs of the first polarization beam splitter are lowered.

SECOND EMBODIMENT

In comparison with the first embodiment, the second embodiment is characterized in that the first polarization beam splitter 3 is mounted on the base plate B with the aid of a holder 30. The rest of the construction of this second embodiment is the same as that of the first embodiment, so duplicate explanation is omitted.

Figure 5:
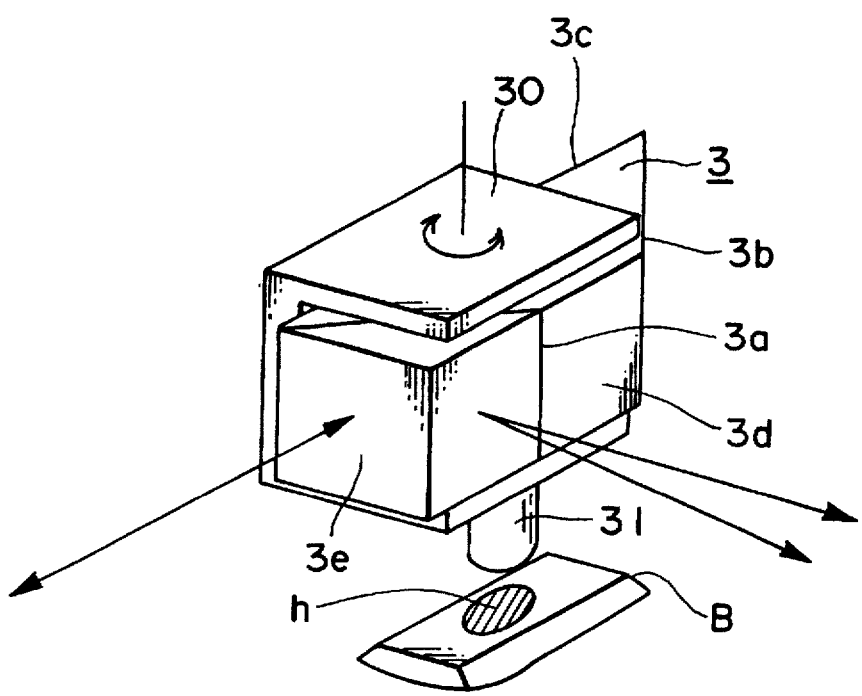
FIG. 5 is a perspective view of a first polarization beam splitter and a holder in an information reproducing device according to a second embodiment of the present invention.

FIG. 5 shows the mechanical relationship between the first polarization beam splitter 3, the holder 30, and the base plate B in this second embodiment. The first polarization beam splitter 3 has the same construction as the first polarization beam splitter 3 of the first embodiment. The holder 30 that holds this first polarization beam splitter 3 has a cross-sectional shape as a letter "U" and holds the first polarization beam splitter 3 by the upper and lower surfaces and the side surfaces 3c, where laser light is not incident or emitted. Consequently, the surfaces 3b, 3d, 3e where laser light passes are not covered by this holder 30.

A rotary shaft 31 parallel to the surfaces 3a through 3e is implanted in the underside surface of this holder 30. In addition, the base plate B is formed with a hole h which permits rotation of the rotary shaft 31 therein, but generates some degree of friction with the rotary shaft 31 therebetween. Consequently, by inserting the rotary shaft 31 into the hole h, the first polarization beam splitter 3 can be rotated with respect to the optical path 1 in the plane of the P polarization.

After inclining adjustment of the first polarization beam splitter 3 as described above in the first embodiment, the adjusted state of the holder 30 can be maintained with the friction between the rotary shaft 31 and the hole h. Readjustment after the adjustment is also possible. Risk of the rotary shaft 31 being rotated with respect to the hole h by vibration etc, may be addressed by injecting adhesive into the hole h.

With an information reproducing device according to the present invention constructed as described above, the designed reflectance for the P polarized light can be realized even with polarization beam splitters which are not manufactured perfectly, by utilizing the dependency of reflectance on incident angle (that is, inclinational characteristic) which means that the reflectance for P polarized light at the polarizing separating plane changes depending on incident angle.

What is claimed is:

1. An information reproducing device wherein linearly polarized light is incident on a magnetic film of a magneto-optic disk, and information recorded on the magnetic film is reproduced based on a change in a direction of polarization of the linearly polarized light reflected by the magnetic film, comprising:

means for emitting the linearly polarized light;

means for detecting the change in a direction of polarization of the linearly polarized light reflected by the magnetic film;

a beam splitter having a polarizing separating plane, said beam splitter being located between the emitting means and the magneto-optic disk such that the polarizing separating plane intersects an optical path of the reflected polarized light at an angle deviated by a predetermined angle from a design angle at which the polarizing separating plane should originally intersect the optical path of the reflected polarized light, said beam splitter being rotatable about an axis for adjustment of the angle of intersection; and said axis being both perpendicular to said reflected light and parallel to said polarizing separating plane.

2. An information reproducing device according to claim 1, wherein the angle at which the polarizing separating plane intersects the optical path of the reflected polarized light is adjusted to reflect 20% of the P polarization component of the reflected polarized light.

3. An information reproducing device according to claim 1, wherein the polarization beam splitter is rotatable in a plane of incidence of the reflected polarized light with respect to the polarizing separating plane.

4. An information reproducing device according to claim 3, further comprising:
means for supporting the polarization beam splitter for rotation with respect to the optical path of the reflected polarized light.

5. The information reproducing device of claim 1, wherein said predetermined design angle is 45°.

6. The information reproducing device of claim 5, wherein said angle is defined as 1°.

7. The information reproducing device of claim 1, wherein said angle is defined in accordance with a reflectance of the polarizing separating plane for a P polarization component of said linearly polarized light.

8. The information reproducing device of claim 1, wherein said angle is defined in accordance with a reflectance of the polarizing separating plane until a P polarization component of said linearly polarized light equaling a predetermined value.

9. The information reproducing device of claim 1, wherein said angle is defined in accordance with a reflectance of the polarizing separating plane until a P polarization component of said linearly polarized light equaling 20%.

10. An information reproducing device wherein polarized light is incident on a magnetic film of a magneto-optic disk and information recorded on the magnetic film is reproduced based on change in a direction of polarization of the polarized light reflected by the magnetic film, comprising:
means for emitting the linearly polarized light;
means for detecting the change in a direction of polarization of the linearly polarized light reflected by the magnetic film;
a polarization beam splitter provided with a polarizing separating plane that reflects S polarization component of the reflected polarized light, and intersects an optical path of the reflected polarized at an angle deviated by a predetermined angle from a design angle at which the polarizing separating plane should originally intersect the optical path of the reflected polarized light, said beam splitter being rotatable about an axis for adjustment of the angle of intersection; and
said axis being both perpendicular to said reflected light and parallel to said polarizing separating plane.

11. An information reproducing device wherein linearly polarized light is incident on a magnetic film of a magneto-optic disk, and information recorded on the magnetic film is reproduced based on change in a direction of polarization of the polarized light reflected by the magnetic film, comprising:

a light emitter which emits linearly polarized light;
a detection device which detects the change in a direction of polarization of the linearly polarized light reflected by the magnetic film;
a beam splitter having a polarizing separating plane, said beam splitter being located between the light emitter and the magneto-optic disk such that the polarizing separating plane intersects an optical path of the reflected polarized light at an angle deviated by a predetermined angle from a design angle at which the polarizing separating plane should originally intersect the optical path of the reflected polarized light, said beam splitter being rotatable about an axis for adjustment of the angle of intersection; and
said axis being both perpendicular to said reflected light and parallel to said polarizing separating plane.

12. An information reproducing device according to claim 11, wherein the angle at which the polarizing separating plane intersects the optical path of the reflected polarized light is adjusted to reflect 20% of the P polarization component of the reflected polarized light.

13. The information reproducing device according to claim 11, wherein the polarization beam splitter is rotatable in a plane of incidence of the reflected polarized light with respect to the polarizing separating plane.

14. An information reproducing device according to claim 13, further comprising a holding unit which holds the polarization beam splitter rotatably with respect to the optical path of the reflected polarized light.

15. A method for adjusting a reflectivity of a first beam splitter of an information reproducing device which radiates linearly polarized light on a magnetic film of a magneto-optic disk and reproduces information recorded on the magnetic film based on a change in a direction of polarization of the polarized light reflected by the magnetic film, a polarizing separating plane of said first beam splitter said reflecting light reflected by said magnetic film, comprising:
separating said polarized light, reflected by the beam splitter with a second beam splitter, into two polarization components having directions of polarization which cross each other and make an identical angle with a plane of incidence of said polarized light to said polarizing separating plane of said first beam splitter;
detecting a light quantity of said two polarization components; and
rotating said first beam splitter about an axis to maximize said detected light quality of said two polarization components, said axis being parallel to said polarizing separating plane and perpendicular to a direction of said light reflected by said magnetic film.

* * * * *

UNITED STATES PATENT AND TRADEMARK OFFICE
CERTIFICATE OF CORRECTION

PATENT NO. : 5,790,501
DATED : August 4, 1998
INVENTOR(S) : T. Kase, et. al.

It is certified that error appears in the above-identified patent and that said Letters Patent is hereby corrected as shown below:

At column 9, line 42 (claim 10, line 13) of the printed patent, change "polarized at" to --- polarized light at---.

Signed and Sealed this

Sixth Day of April, 1999

Attest:

Attesting Officer

Q. TODD DICKINSON

Acting Commissioner of Patents and Trademarks